United States Patent
Stanchina et al.

(10) Patent No.: US 10,203,422 B2
(45) Date of Patent: Feb. 12, 2019

(54) METHOD FOR CALIBRATING AN IONISING RADIATION DETECTOR AND ASSOCIATED DEVICE

(71) Applicants: COMMISSARIAT ÀL'ÉNERGIE ATOMIQUE ET AUX ÉNERGIES ALTERNATIVES, Paris (FR); Safran Identity & Security, Issy les Moulineaux (FR)

(72) Inventors: Sylvain Stanchina, Grenoble (FR); Guillaume Montemont, Grenoble (FR)

(73) Assignees: COMMISSARIAT ÀL'ÉNERGIE ATOMIQUE ET AUX ÉNERGIES ALTERNATIVES, Paris (FR); SAFRAN IDENTITY & SECURITY, Issy les Moulineaux (FR)

(*) Notice: Subject to any disclaimer, the term of this patent is extended or adjusted under 35 U.S.C. 154(b) by 0 days.

(21) Appl. No.: 15/538,476

(22) PCT Filed: Dec. 18, 2015

(86) PCT No.: PCT/EP2015/080661
§ 371 (c)(1),
(2) Date: Jun. 21, 2017

(87) PCT Pub. No.: WO2016/102406
PCT Pub. Date: Jun. 30, 2016

(65) Prior Publication Data
US 2017/0343686 A1     Nov. 30, 2017

(30) Foreign Application Priority Data

Dec. 22, 2014 (FR) ..................................... 14 63095

(51) Int. Cl.
*G01T 7/00*     (2006.01)
*G01T 1/167*     (2006.01)
(Continued)

(52) U.S. Cl.
CPC .............. *G01T 7/005* (2013.01); *G01T 1/167* (2013.01); *G01T 1/2914* (2013.01); *G01T 1/2928* (2013.01); *H01J 49/0009* (2013.01)

(58) Field of Classification Search
CPC ....... G01T 1/167; G01T 1/2914; G01T 7/005; H01J 49/0009
See application file for complete search history.

(56) References Cited

U.S. PATENT DOCUMENTS

2003/0062473 A1*   4/2003   Weinberger ......... H01J 49/0009
                                                          250/287
2011/0297838 A1    12/2011   Wangerin et al.

FOREIGN PATENT DOCUMENTS

FR         2 950 979 A1     4/2011

OTHER PUBLICATIONS

U.S. Appl. No. 15/538,494 with the title "Method for Calibrating an Ionising Radiation Detector and Associated Device" dated Jun. 21, 2017.

(Continued)

*Primary Examiner* — Mark R Gaworecki
(74) *Attorney, Agent, or Firm* — Pearne & Gordon LLP (57) ABSTRACT

A method for calibrating an ionizing radiation detector, with the aim of determining a correction factor in order to establish an amplitude-energy correspondence The invention first relates to a method for calibrating a device for detecting ionizing radiation, the detector comprising a semiconductor or scintillator detection material capable of generating a signal S of amplitude A upon interaction between ionizing radiation and the detection material, the method including the determination of a weighting factor of amplitude A.

7 Claims, 4 Drawing Sheets

(51) Int. Cl.
*H01J 49/00* (2006.01)
*G01T 1/29* (2006.01)

(56) References Cited

OTHER PUBLICATIONS

Zhong, H., et al., "1-D position sensitive single carrier semiconductor detectors", Nuclear Instruments and Methods in Physics Research, Section A, vol. 380 (Oct. 1, 1996), pp. 228-231.
French Search Report issued in Patent Application No. FR 1463095 dated Nov. 6, 2015.
International Search Report Issued in Patent Application No. PCT/EP2015/080661 dated Mar. 9, 2016.
Written Opinion Issued in Patent Application No. PCT/EP2015/080661 dated Mar. 9, 2016.

\* cited by examiner

METHOD FOR CALIBRATING AN IONISING RADIATION DETECTOR AND ASSOCIATED DEVICE

TECHNICAL DOMAIN

This invention relates to the field of ionising radiation detectors, particularly for nuclear, medical or non-destructive testing applications.

STATE OF PRIOR ART

Spectrometry is a method commonly used in the domain of detection of ionising radiation. It consists of exposing a detector facing a source of ionising radiation, detecting a plurality of radiation interactions in a detection material, estimating the transferred energy in the detector material, for each interaction, so as to obtain a histogram representing the number of interactions detected for different given energy ranges. This histogram is called the energy spectrum.

In general, a spectrometry device comprises a detection material, capable of inducing an interaction with an incident ionising radiation. Each interaction generates charge carriers, that are collected by an electrode. An electronic circuit connected to the electrode generates an electrical signal from collected charge carriers. The electrical signal is generally in the form of a pulse, the amplitude of which depends on the number of collected charge carriers. A memory located downstream from the electronic circuit collects all pulses formed, each pulse corresponding to one interaction in the detection material. This memory then classifies pulses as a function of their amplitude, to provide a histogram comprising the number of pulses detected as a function of their amplitude. This histogram is called an amplitude spectrum.

The amplitude of each detected pulse depends on the quantity of charge collected by charge carriers following the interaction, this quantity depending on the energy lost through incident radiation during its interaction in the detection material, this energy also being called the interaction energy.

Thus, the amplitude of each pulse depends on the energy lost by incident radiation during the interaction that led to said pulse.

In gamma spectrometry devices, this dependence usually corresponds to a proportionality relation. In other words, the amplitude of a pulse produced by the electronic circuit connected to the detection material is proportional to the energy lost by the ionising radiation during its interaction. When the radiation is stopped in the detection material, by a photoelectric effect or by multiple inelastic diffusions, it gives up all its energy. The amplitude of the collected pulse is then proportional to the energy of the incident radiation.

The relation between amplitude and energy is then made by irradiating the detector using a reference source, outputting radiation for which the energy is known. This operation is energy calibration. For example, in the context of gamma spectrometry, the detector is exposed to a $^{137}$Cs type source, producing photons with an energy of 661.6 keV. A $^{60}$Co source can also be used producing photons with energy of 1173 keV and 1332 keV. A $^{57}$Co source can also be used producing photons with energy of 122 keV. An amplitude spectrum of measured signals is made when the detector is exposed to such radiation, then known energy values at the main peaks of the energy spectrum are assigned manually.

During the energy calibration, the detector acquires a spectrum comprising peaks, and particularly "photoelectric" peaks, corresponding to interactions in progress during which incident radiation transfers all its energy to the detection material. These peaks can then be identified and can be manually made to correspond to one of the photon energies produced by the reference source.

With such a calibration, the amplitude spectrum becomes an energy spectrum due to the amplitude energy relation thus set up.

Such a calibration firstly assumes a precise identification of the peaks. Therefore its precision depends on the precision with which peaks are identified.

Moreover, the corresponding amplitude of the peak (usually the amplitude at which the peak is at its maximum) and the energy is made manually, which cannot be envisaged when a detector is used making use of a number of measurement channels exceeding a few units, and particularly when the detector is an imager, comprising several hundred or even several thousand measurement channels.

PRESENTATION OF THE INVENTION

The invention discloses an alternative solution to this energy calibration, that can be implemented automatically.

A first purpose of the invention is a method for calibrating a device for detecting ionising radiation, the device comprising a detector capable of generating electrical charges under the effect of an interaction between ionising radiation in said detector, the method including the following steps:

a) irradiation of the detector using a known reference source, said source producing ionising radiation so as to generate interactions in the detector, b) selection of a plurality of correction factors j, and determination of a plurality of reference spectra $\text{Spref}_j$, each reference spectrum being associated with a correction factor j, each reference spectrum representing a distribution of the amplitude A of the signal S generated when the detector is irradiated by said reference source Sref, the amplitude A of the signal S being weighted by said correction factor j.

c) detection of a plurality of interactions in the detector during said irradiation and, for each interaction, measurement of the amplitude A of an electronic signal S generated by an electrode.

d) for each detected interaction, determination of a calibration function F such that
   each calibration function F is defined on a plurality of correction factors j,
   each term F(j) of said calibration function represents a probability associated with said correction factor j
   each term F(j) being updated at each detected interaction, by combining the amplitude A measured during this interaction with each reference spectrum $SP_{ref,j}$, e) determination of a correction factor $j_{corr}$ by identifying a remarkable point of said calibration function $F_k$.

The correction factor $j_{corr}$ is thus defined during a calibration phase of the detector before a detection phase.

During the detection phase, during each interaction, the signal S derived from this interaction, and particularly its amplitude A, is then modulated by the correction factor j thus determined.

This process is performed automatically, without involving any identification of peaks and without requiring action to manually define a correspondence between the amplitude corresponding to a peak and a predetermined energy value.

Step b) can include:

i load an initial reference spectrum $Sp_{ref}$ previously saved in a memory, corresponding to said reference source $S_{ref}$, this spectrum $Sp_{ref}$ representing the probability distribution of the amplitude of the detected signal when the detector is irradiated by said reference source $S_{ref}$, ii starting from the initial reference spectrum $Sp_{ref}$ determine a plurality of reference spectra $Sp_{ref_j}$, each reference spectrum $Sp_{ref_j}$ having been obtained from the initial reference spectrum $Sp_{ref}$, each value $Sp_{ref_j}(i)$ of the reference spectrum being obtained from the value Spref (i/j).

During this step, the correction factors j considered can be determined arbitrarily between a minimum value $j_{min}$ and a maximum value $j_{Max}$.

The term correction factor denotes a positive number j that will modulate the reference spectrum Spref corresponding to the reference source, by normalising the variable i, corresponding to the amplitude (or energy) so as to establish a reference spectrum associated with the correction factor j Spref$_j$ such that Spref$_j$(i/j)=Spref(i)*$K_{norm}$(j), the term $K_{norm}$(j) being a standardisation term that can be equal to 1 or 1/j.

Step d) can include the following steps:
i Initialisation of the calibration function F
ii At each detected interaction, update the calibration function, by adding the value of the corrected reference spectrum Spref$_j$(A) to each term F(j) in this function, at said amplitude A,
iii Repeat step ii until a predefined stop criterion is reached.

In particular, the calibration function F can be initialised such that F(j)=F$^0$(j), each value F$^0$(j) representing the initial value of the term Fk(j). All the initial values F$^0$(j) can be equal to the same number, for example 0.

The predefined stop criterion can be a predetermined number of days for each calibration function F, or a predefined detector irradiation time, or a predefined number of detected interactions, or a maximum value reached by one or several terms F(j) of one or several calibration functions F.

During step e), the correction factor $j_{corr}$ can be determined by identifying the value of j that maximises the value of the calibration function $F_k$, in which case:

$$j_{corr} = \text{argmax}_j[F(j)]$$

The initial reference spectrum Spref or each reference spectrum Spref$_j$ preferably comprises one or a plurality of significant peaks isolated from each other. Preferably, the number of significant peaks $P_1 \ldots P_n$ forming the reference spectrum is between 1 and 10, and preferably more than 1. A significant peak refers to a peak that is more the 2 times, and preferably more than 5 times the background noise level on each side of this peak.

According to one example, step d) comprises an iterative update of the calibration function $F_k$ such that For all values of j between $j_{min}$ and $j_{max}$, $F^p(j)=F^{p-1}(j)+$Spref$_j$(A)

in which:
$F^{p-1}$(j) is the value of the term F (j) before the $p^{th}$ iteration,
$F^p$(j) is the value of the term F (j) after the $p^{th}$ iteration,
A is the amplitude of the signal S measured by an electrode following an interaction. In this example, the signal $S_{A0}$ measured by the winning anode A0 is considered, therefore A=$A_{A0}$.
p is the iteration index corresponding to the rank of the update. During the first update, p=1.

According to one variant:
steps c), d) and e) are repeated iteratively, each step e) leading to the determination of a partial correction factor $j^q$, where q denotes the iteration rank,
and, following the first iteration, step d) comprises the update of each term F(j) by weighting said amplitude A by the product of partial correction factors $j^1 \ldots j^q$, these partial correction factors having been determined during the previous q iterations.

Step e) in the last iteration of the method then consists of determining the correction factor $j_{corr}$ as a function of the product of the partial correction factors $j^1 \ldots j^q$ determined during successive iterations, this product corresponding to an intermediate correction factor Thus, a first determination of a first partial correction factor is made using steps a) to e) described above, this partial correction factor being denoted $j^1$. Steps c), d) and e) are then reiterated and during the update to the calibration function $F_k$, the amplitude A of the signal S is weighted by the partial correction factor $j_k^1$ determined during the previous iteration.

In general, during each interaction q, steps c), d) and e) are reiterated so as to obtain a partial correction factor $j^q$ and, during the next iteration, the update to the calibration function $F_k$ is made by weighting the amplitude A of the signal S considered by the product of partial correction factors $j^1 \ldots j^q$ determined during the q previous iterations. This product corresponds to an intermediate correction factor.

The detector can be:
a scintillator type detector comprising a scintillator detector material, capable of producing scintillation photons, particularly visible photons, during an interaction with ionising radiation, this material being coupled to a photodetector capable of producing electrical charges in response to said scintillation photons
a semiconductor type detector comprising a semiconducting detection material placed between two electrodes, said semiconducting detection material being capable of generating electrical charges during an interaction with ionising radiation.

A second purpose of the invention is a device for the detection of ionising radiation, for implementation of the method described above. Such a device comprises particularly:
a) a detector, comprising a semiconducting detection material extending between two electrodes, the detector being capable of generating charge carriers under the effect of an interaction with ionising radiation
b) an electronic processing circuit capable of forming a signal S from charge carriers collected by an electrode during an interaction and determining its amplitude A.
c) an electronic calibration circuit configured to implement steps b), c) and d) and e) in the calibration method described above.

DETAILED PRESENTATION OF PARTICULAR EMBODIMENTS

Figure 1A:
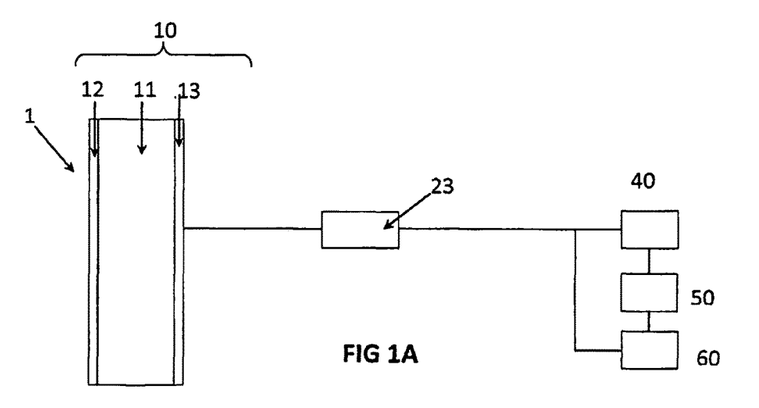
FIG. 1A represents a diagram of the detection device.

FIG. 1 represents a device 1 for the detection of ionising radiation according to the invention. It comprises a detector 10 made from a semiconducting material 11, that can be polarised by a cathode 12 and an anode 13. The semiconducting material is CdTe in this example. It could be another semiconducting material frequently used for the detection of ionising radiation (Si, CdZnTe . . . ). The thickness of the material is a few millimeters, for example 5 mm.

Electrons have better charge mobility properties in a CdTe type material. Also, signals giving more precise information about the energy deposited by an interaction in the detector are signals output from the anode 13.

The device also comprises an electronic amplification circuit 23, associated with the anode, so as to produce an anode signal with an amplitude proportional to the number of charge carriers collected by the anode after an interaction. Such a circuit is known and will not be described in detail.

The electronic amplification circuit can also be connected to the cathode instead of the anode. According to one variant, the anode and the cathode each have their own amplification circuit.

Thus in general, each interaction in the detector leads to the collection of charge carriers by at least one electrode E (anode A or cathode K) so as to generate an electronic signal S with an amplitude A.

The term amplitude denotes the maximum height of a signal, when the signal is in the form of a pulse. It can also be the integral of this signal, or any other function of the maximum height or the integral. In general, the amplitude represents the quantity of charges collected by the E during an interaction.

The detection device 1 also comprises an electronic calibration circuit 40 capable of implementing the detector calibration method. This circuit is an important element of the invention and will be described below.

The detection device 1 also comprises an electronic correction 50, capable of applying a correction factor $j_{corr}$ to an electrode signal S. In general, this correction factor is assigned to the amplitude A of the signal S from the anode A (or possibly to the signal from the cathode K).

The detection device is capable of detecting ionising radiation. The term ionising radiation denotes radiation capable of generating charge carriers in the detector 11. In particular, it can be X-radiation, γ radiation, charged particles (particularly α or β particles) or neutrons.

The amplification circuit 23 is known and will not be described in detail.

Figure 1B:
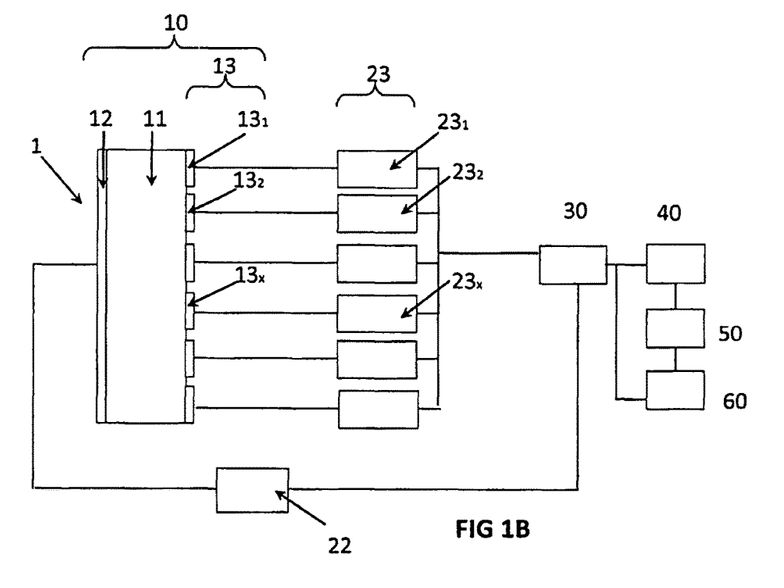
FIG. 1B represents a diagram of another embodiment of the detection device.

According to another embodiment, the anode 13 of the detector is divided into a plurality of elementary anodes $13_1 \ldots 13x$, each elementary anode being connected to an elementary amplification circuit $23_1 \ldots 23_x$. A localisation circuit 30 is capable of determining which elementary anode collected the signal output from the interaction and applying the calibration method to this anode. The cathode 12 can also include an electronic amplification circuit 22.

Figure 2A:
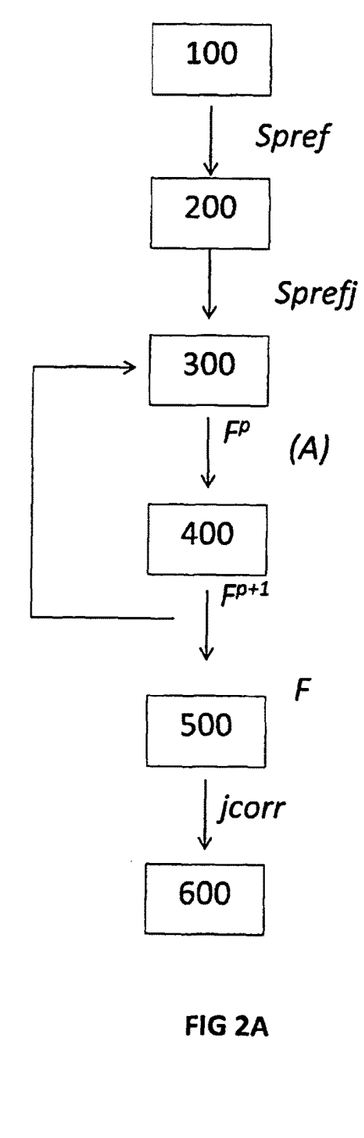
FIG. 2A represents the different steps of the calibration method, according to a first embodiment of the invention.

The calibration method used by the electronic calibration circuit 40 will now be described with reference to FIG. 2. Its function is to determine a correction factor $j_{corr}$, this correction factor subsequently being applied to the amplitude of a signal S collected by an electrode, and more particularly by the anode. This calibration circuit is implemented when the detection device 1 is in a calibration mode.

The basic concept of calibration is to irradiate the detection device 1 with a known source of ionising radiation, called the reference source $S_{ref}$, for which the theoretical response of the detection device is known. The objective then is to analyse signals generated in response to this irradiation, and to determine an appropriate correction based on the theoretical response of the detector facing this reference source, this theoretical response possibly being qualified as a reference response.

FIG. 2 represents the steps in a first embodiment of the calibration method. In a first step 100, a reference source $S_{ref}$ is placed facing the detection device 1, knowing that the response $Sp_{ref}$ of the device in this configuration is known. In this example, the response of the detector is an energy spectrum, produced by the detector in response to the source.

An energy spectrum means the amplitude distribution of signals S output from an electrode E during exposure of the detector to a radiation source. Such a spectrum is in the form of a histogram Sp in which each term Sp(i) represents the number of signals detected by the electrode considered, with an amplitude equal to i. Amplitude equal to i means an amplitude within the amplitude range i containing the value i and for example centred around the value i. Each channel with amplitude i corresponds to a known energy.

This response can also be determined by modelling the detector. It can also be determined experimentally, by adopting a sufficiently long acquisition time to be statistically representative.

In the example considered, the reference response $Sp_{ref}$ is an energy spectrum corresponding to the spectrum "theoretically" produced by the detector 11 in response to the reference source Sref.

Figure 3:
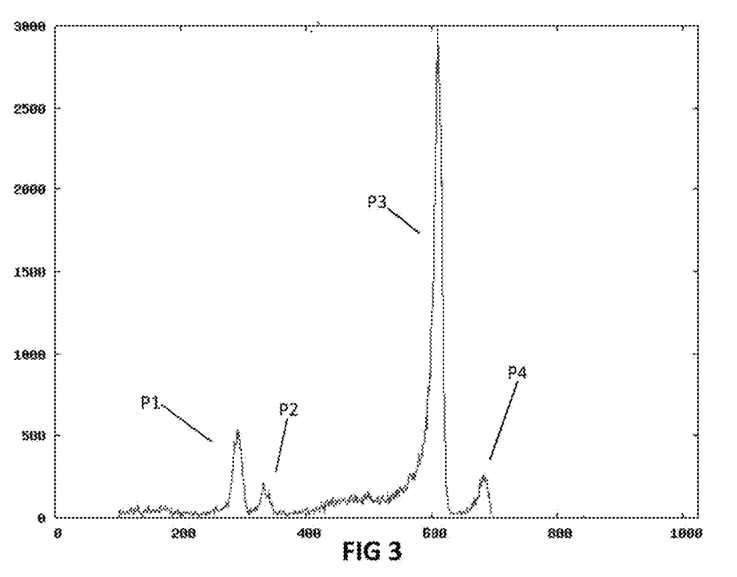
FIG. 3 represents an example of a reference spectrum Spref.

FIG. 3 represents such a reference spectrum $Sp_{ref}$. It comprises several peaks P1, P2, P3, P4 standing out from the background noise B. It is preferable if the initial reference spectrum Spref comprises at least one and preferably a plurality of peaks, preferably between 1 and 20 peaks. Preferably, the width of a peak at its mid-height is less than a tenth or even a twentieth or thirtieth of the range of the spectrum, which is the range of amplitudes over which the spectrum is recorded. Preferably, each peak has a height equal to at least twice, and preferably at least five times, the noise level on each side of the peak. The example in FIG. 3 represents the spectrum for a $^{57}$Co source. The photoelectric peak corresponding to the emission of gamma photons with an energy of 122 keV, and the X-fluorescence peaks of the material from which the collimator of the source is made, in this case Tungsten, can be seen.

Such a spectrum $Sp_{ref}$ can be treated like a probability distribution of measuring a given amplitude knowing the reference source irradiating the detector.

The first step 100 in the calibration method is to load a reference spectrum Spref, corresponding to a reference source Sref. This reference spectrum is designated the initial reference spectrum.

The purpose of the second step 200 is to start from the initial reference spectrum $Sp_{ref}$ and produce a plurality of reference spectra $Sp_{ref,j}$, each being associated with a correction factor j. Each spectrum $Sp_{ref,j}$ corresponds to the initial reference spectrum $Sp_{ref}$ taking account of a correction factor equal to j. A correction factor j is a positive coefficient between a minimum value $j_{min}$ and a maximum value $j_{max}$. $j_{min}$ and $j_{max}$ are defined arbitrarily. In this example, $0.8 \leq j \leq 2$. Preferably, the interval $j_{min} < 1$ and $j_{max} > 1$. The values of j are selected and predetermined.

More precisely, if $Sp_{ref}$ (i) designates the value of the spectrum $Sp_{ref}$ corresponding to the channel with amplitude i, the reference spectrum associated with the correction coefficient j can be written $Spref_j(i) = Sp_{ref}(i/j)$. Each channel of a spectrum $Sp_{refj}$ represents the number of signals collected with an amplitude within an interval $$\frac{\Delta i}{j}$$

centred around the value $$\frac{i}{j}.$$

The above equation can also include a normalisation term $K_{norm}(j)$, that can be equal to 1 or equal to 1/j, in which case $$Spref_j(i) = \frac{Spref(i/j)}{j}. \quad (1)$$

Using this normalisation term then makes it possible to keep the integral of the spectrum constant.

When the correction factor j is more than 1, the reference spectrum $Spref_j$ corresponds to compression of the initial reference spectrum Spref, to the extent that the information in the spectrum is concentrated on a number of channels smaller than the number of channels making up the spectrum Spref.

Conversely, when the correction factor j is less than 1, the reference spectrum Spref, corresponds to expansion of the initial reference spectrum Spref, the information in the spectrum being expanded to a number of channels larger than the number of channels making up the initial reference spectrum Spref.

Figure 4:
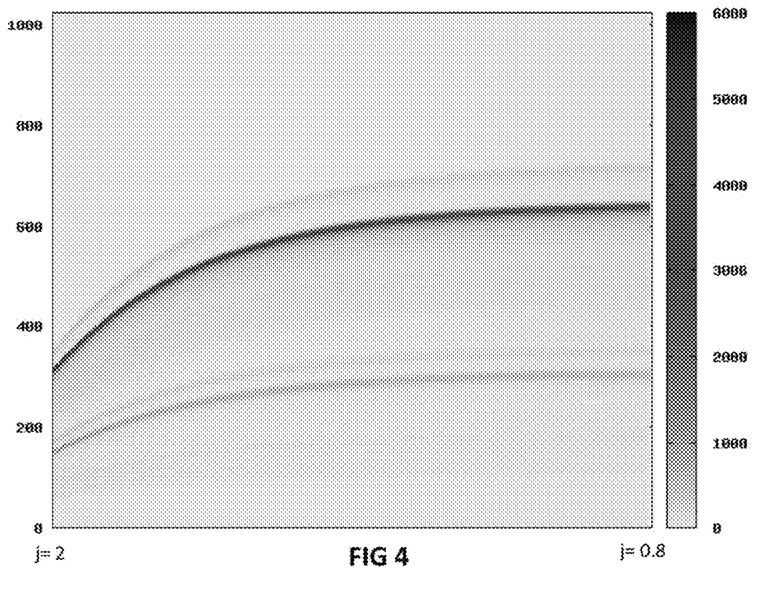
FIG. 4 represents a plurality of corrected reference spectra Spref$_j$.

FIG. 4 shows several reference spectra $Spref_j$ associated with a correction coefficient j between 0.8 and 2. More precisely, each column in FIG. 4 corresponding to an abscissa j represents a reference spectrum $Spref_j$. Thus, a weight $P_{ji}$ is assigned to each point (j,i) indicated by the grey levels scale, this weight representing the value of the spectrum $Sp_{refj}$ at amplitude i, such that $P_{ji} = Sprefj(i)$. The abscissas scale in FIG. 4 is not linear.

Thus, each column in FIG. 4 represents a probability distribution of the amplitude measured by the detector, knowing the correction factor j, when the detector is irradiated by the reference source Sref, the correction factor j being the abscissa of the column. Furthermore, each line in FIG. 4 corresponding to an amplitude i represents a probability distribution of the correction coefficient j, when this amplitude is measured, the detector being irradiated by the reference source Sref.

In other words, when the detector is irradiated by the reference source Sref, if a signal S with amplitude A is measured, the distribution formed by the set of values $Sprefj(A)$, where j is between $j_{min}$ and $j_{max}$, corresponds to a probability distribution of the correction factor j to be applied, knowing the measurement of this amplitude A.

By constructing a plurality of reference spectra $Spref_j$, corresponding to a column with abscissa j on FIG. 4, we can determine a plurality of probability distributions, a correction factor j, knowing a measured amplitude A. These distributions will be used in the next step.

Figure 5:
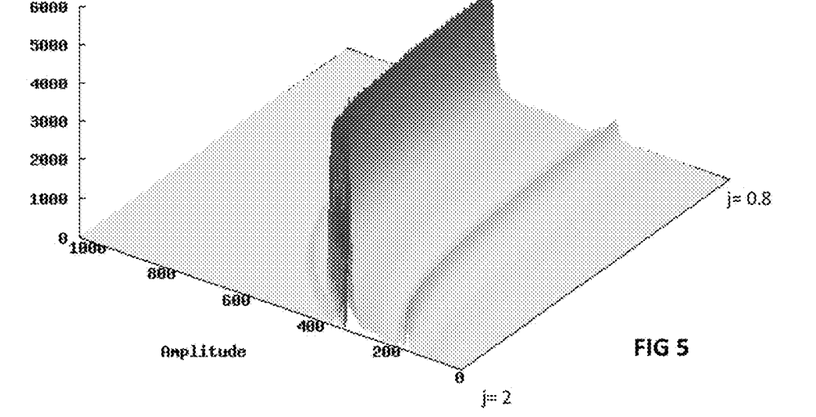
FIG. 5 represents a 3-dimensional view of a plurality of corrected reference spectra $Spref_j$.

FIG. 5 is a 3-dimensional view of FIG. 4. Each profile, corresponding to a fixed value of the correction factor j, represents a reference spectrum $Sp_{ref}$.

The third step 300 consists of irradiating the detector using a reference radiation source Sref, corresponding to the reference spectrum Spref. During each interaction, a signal S is collected at the terminals of an electrode E (anode 13, elementary anode 13x or cathode 12), this signal then being processed by the amplification circuit 3 attached to the electrode E.

The fourth step 400 consists of creating a calibration function F. More precisely, during this step, the calibration function F is updated as a function of the signal S collected during step 300, and particularly as a function of its amplitude.

Initially, each calibration function F is initialised to a predetermined value, for example a null value: regardless of the value of j, F(j)=0. This fourth step in the method consists of updating each function F such that every time that an interaction is detected, the value of the corrected reference spectrum $Spref_j$ corresponding to the amplitude A of the signal measured at each interaction is added to each term F(j), for j between $j_{min}$ and $j_{max}$.

In other words, the calibration function F is updated for each detected interaction, using the following iterative equation:

For all values of j between $j_{min}$ and $j_{max}$, $F^p(j) = F^{p-1}(j) + Spref_j(A)$ in which:
$F^{p-1}(j)$ is the value of the term F(j) before iteration i,
$F^{p-1}(j)$ is the value of the term F(j) after iteration i,
A is the amplitude of the signal S measured by an electrode, for example the anode, following each interaction.

This iterative update is made for a plurality of detected interactions, until a stop criterion is reached, for example a predetermined number of iterations or a maximum value reached by one or several values of the function F.

Figure 6:
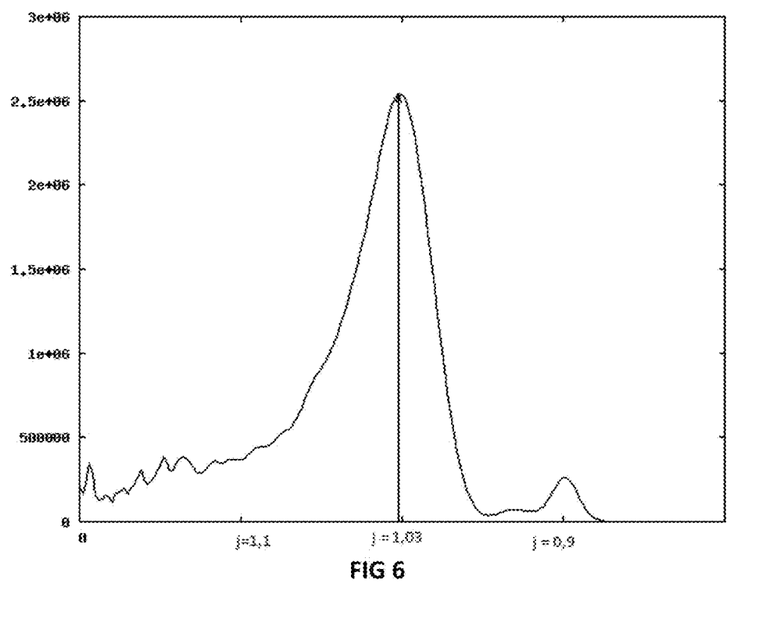
FIG. 6 represents a calibration function F, from which a correction factor $j_{corr}$ can be extracted.

FIG. 6 represents a calibration function obtained after 1000 updates, this number usually being between a few hundred and a few thousand. The abscissas axis represents correction factors j between $j_{min}$ and $j_{max}$. The ordinates axis represents values of the calibration function F(j).

Each term F(j) is proportional to the probability that the correction factor $j_{corr}$, to be applied to each interaction, is equal to j.

The fifth step 500 is determination of the correction factor $j_{corr}$ as a function of a remarkable point of the calibration function F, and for example as a function of the correction factor j for which the value of the function F is maximum.

In this example, $j_{corr} = \text{argmax} [Fk(j)]$. Returning to the example in FIG. 6, the maximum value of this calibration function occurs at j=1.03. This, in this example, $j_k$=1.03. This means that the correction factor to be applied to the signal S from the anode, and particularly its amplitude, is equal to $j_{corr}$=1.03.

Figure 2B:
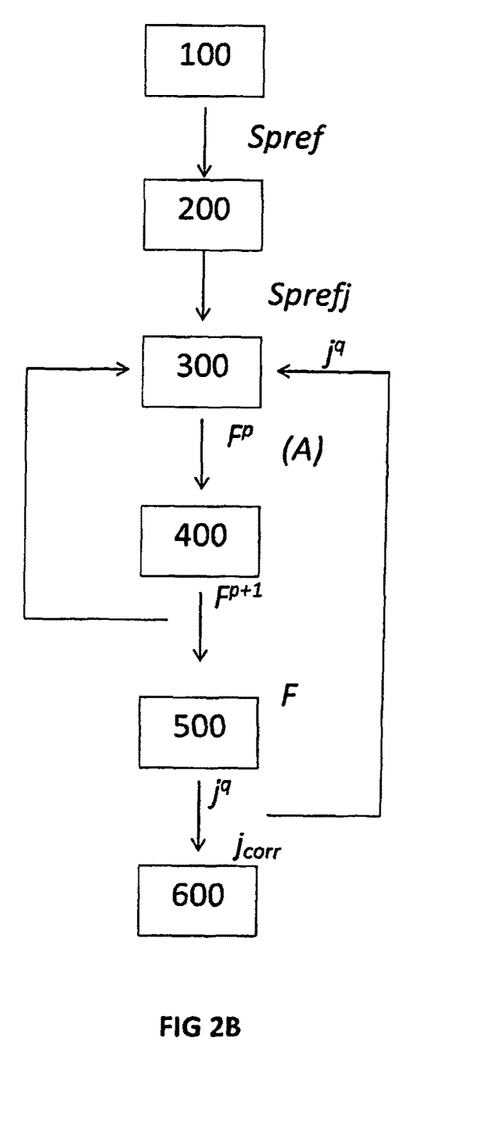
FIG. 2B represents the different steps of the calibration method, according to a variant of a first embodiment of the invention.

According to one variant of this embodiment shown on FIG. 2B, steps c) to e) can be performed iteratively, the correction factor determined during step e) of each iteration q being qualified as a partial correction factor and denoted $j^q$. After the first iteration, during the update of the calibration function F, the amplitude A of the signal S is weighted by the product of the "partial" correction factors $j^1 \ldots j^{q-1}$, determined during the previous iteration or during the q−1 previous iterations, where q denotes the rank of the iteration. This product should be considered as an intermediate correction factor.

For example, step d) comprises an iterative update of the calibration function F such that For any value of j between $j_{min}$ and $j_{max}$; in which:
$F^{p,q}(j) = F^{p-1,q}(j) + \text{Spref}_j(\Pi_{l=1}^{q-1} j^l \times A)$ $F^{p-1,q}(j)$ is the value of the term F (j) before the $p^{th}$ iteration (iteration of the update to the calibration function), during the rank q iteration (iteration in which a partial correction factor is determined)

$F^{p,q}(j)$ is the value of the term $F_k(j)$ after the $p^{th}$ iteration (iteration of the update to the calibration function), during the rank q series (iteration in which a partial correction factor is determined)

A is the amplitude of the signal S measured by an electrode following an interaction. In this example, the signal $S_{A0}$ measured by the winning anode A0 is considered, therefore $A = A_{A0}$.

p is the iteration index corresponding to the rank of the update to the calibration function. During the first update, p=1.

$j^l$ is the partial correction factor, in which $1 \leq l \leq q-1$

Steps c) to e) are then repeated until a stop criterion is reached; this may be a predetermined number of iterations, or a small difference between two successive partial correction factors $j^q$ and $j^{q+1}$. Typically, according to one variant, the number Q of iterations is between 2 and 10.

It is found that during the iterations, the values of the partial correction factors $j^q$ tend towards 1.

During the final iteration, step e) includes determination of the correction factor $j_{corr}$ by calculating the product of partial correction factors $j^1 \ldots j^Q$ successively acquired during each series.

Thus, during step e) of the last iteration, we can determine $j_{corr}$ such that:

$$j_{corr} = \prod_{q=1}^{q=Q} j^q$$

During a step 600, the correction factor $j_{corr}$ is stored in a memory 50.

When the detector 1 comprises a plurality of anodes as shown on FIG. 1B, the calibration is made for each elementary anode, each being assigned a correction factor $j_{corr}$ specific to it. Each correction factor corresponding to an elementary anode, is then stored in the memory 50.

We will now describe an example operation of a detection device as shown diagrammatically on FIG. 1A.

When an interaction occurs in the detection material 11, it generates a signal on the cathode 12 and on the anode 13. The correction circuit 60 applies the correction parameter $j_{corr}$, stored in the memory 50, to the signal emitted by the anode, and corrects the measured amplitude A such that $A^* = j_{corr} \times A$, where $A^*$ designates the corrected amplitude. The calibration circuit 40 is not used during this operating mode.

In the embodiment shown in FIG. 1B, when an interaction occurs in the detection material 11, it generates a signal on the cathode 12 and on the elementary anodes $13_1 \ldots 13_x$. The localisation circuit 30 determines the elementary anode that collected the maximum signal. The correction circuit 60 applies the correction parameter $j_{corr}$ associated with the selected anode, stored in the memory 50, to the signal emitted by the previously selected anode, and corrects the measured amplitude A such that $A^* = j_{corr} \times A$, where $A^*$ designates the corrected amplitude. The calibration circuit 40 is not used during this operating mode.

In the examples described above, the detection material 11 is a semiconductor. The invention is applicable when the detector 10 comprises a scintillator material coupled to a photodetector, the photodetector comprising an electrode capable of generating a signal for which the amplitude depends on the energy lost in the detection material during each interaction.

What is claimed is:

1. Method for calibrating a device (1) for detecting ionising radiation, the device (1) comprising a detector (10) capable of generating electrical charges under the effect of an interaction between ionising radiation in said detector, the method including the following steps:
    a) irradiation of the detector (10) using a known reference source (Sref) so as to generate interactions in the detector,
    b) selection of a plurality of correction factors (j), and determination of reference spectra ($Sp_{ref,j}$), each reference spectrum being associated with a correction factor (j), each reference spectrum representing a distribution of the amplitude (A) of the signal (S) detected when the detector is irradiated by said reference source (Sref), the amplitude (A) of the detected signal being modulated by said correction factor (j);
    c) detection of a plurality of interactions in the detector during said irradiation and, for each interaction, measurement of the amplitude A of an electronic signal S generated by said detector;
    d) for each detected interaction, determination of a calibration function F such that:
        each calibration function F is defined on a plurality of correction factors j,
        each term F(j) of said calibration function represents a probability associated with said correction factor j
        each term F(j) being updated at each detected interaction, by combining the amplitude A measured during this interaction with each reference spectrum $Sp_{ref,j}$,
    e) determination of a correction factor $j_{corr}$ by identifying a remarkable point of said calibration function F.

2. Calibration method according to claim 1, in which each step d) comprises:
    i initialisation of said calibration function F;
    ii at each detected interaction, update the calibration function F, by adding the value of the corrected reference spectrum $Spref_j$ (A) to each term F (j) in this function, at said amplitude A,
    iii repeat step ii until a predefined stop criterion is reached.

3. Calibration method according to claim 1, in which step e) includes determination of the correction factor $j_{corr}$ by identifying the value of j that maximises the value of the function F, in which case:

$j_{corr} = \text{argmax}_j[F(j)]$.

4. Calibration method according to claim 1, in which:
    steps c), d) and e) are repeated iteratively, each step e) leading to the determination of a partial correction factor, where q denotes the iteration rank,
    and in which, following the first iteration, step d) comprises the update of each term F(j) by weighting said amplitude A by the product of partial correction factors $j^1 \ldots j^q$, these factors having been determined during the previous q iterations, step e) in the last iteration of the method then consisting of determining the correction factor $j_{corr}$ as a function of the product of partial correction factors $j^1 \ldots j^Q$ determined during said successive iterations, where Q denotes the number of iterations.

5. Calibration method according to claim 1, in which step b) comprises:
   i load an initial reference spectrum $Sp_{ref}$ previously saved in a memory, corresponding to said reference source $S_{ref}$, this spectrum $Sp_{ref}$ representing the distribution of the amplitude of the detected signal when the detector is irradiated by said reference source $S_{ref}$;
   ii starting from the initial reference spectrum $Sp_{ref}$, determine a plurality of reference spectra $Sp_{ref,j}$, each reference spectrum $Sp_{ref,j}$ having been obtained from the initial reference spectrum $Sp_{ref}$, each value $Sp_{ref,j}(i)$ of the reference spectrum being obtained from the value Spref (i/j).

6. Calibration method according to claim 1, the detector (10) comprising a scintillator detection material or a semiconducting detection material (11).

7. Device for detection of ionising radiation comprising:
   a detector (10), the detector being capable of generating charge carriers under the effect of an interaction with said ionising radiation
   an electronic amplification circuit (22, 23) capable of forming a signal S from charge carriers collected by an electrode during an interaction and determining its amplitude A; an electronic calibration circuit (40) configured to perform the following steps: selection of a plurality of correction factors (j), and determination of reference spectra ($Sp_{ref,j}$), each reference spectrum being associated with a correction factor (j), each reference spectrum representing a distribution of the amplitude (A) of the signal (S) detected when the detector is irradiated by said reference source (Sref), the amplitude (A) of the detected signal being modulated by said correction factor (j);

detection of a plurality of interactions in the detector during said irradiation and, for each interaction, measurement of the amplitude A of an electronic signal S generated by said detector;

for each detected interaction, determination of a calibration function F such that:
   i each calibration function F is defined on a plurality of correction factors j,
   ii each term F(j) of said calibration function represents a probability associated with said correction factor j
   iii each term F(j) being updated at each detected interaction, by combining the amplitude A measured during this interaction with each reference spectrum $Sp_{ref,j}$, determination of a correction factor $j_{corr}$ by identifying a remarkable point of said calibration function F.

* * * * *

UNITED STATES PATENT AND TRADEMARK OFFICE
CERTIFICATE OF CORRECTION

PATENT NO. : 10,203,422 B2
APPLICATION NO. : 15/538476
DATED : February 12, 2019
INVENTOR(S) : Sylvain Stanchina et al.

Page 1 of 1

It is certified that error appears in the above-identified patent and that said Letters Patent is hereby corrected as shown below:

In the Specification

Column 7, Line 38, "Spref," should read -- $Spref_j$ --.

Signed and Sealed this
Seventh Day of May, 2019

Andrei Iancu
*Director of the United States Patent and Trademark Office*